UNITED STATES PATENT OFFICE.

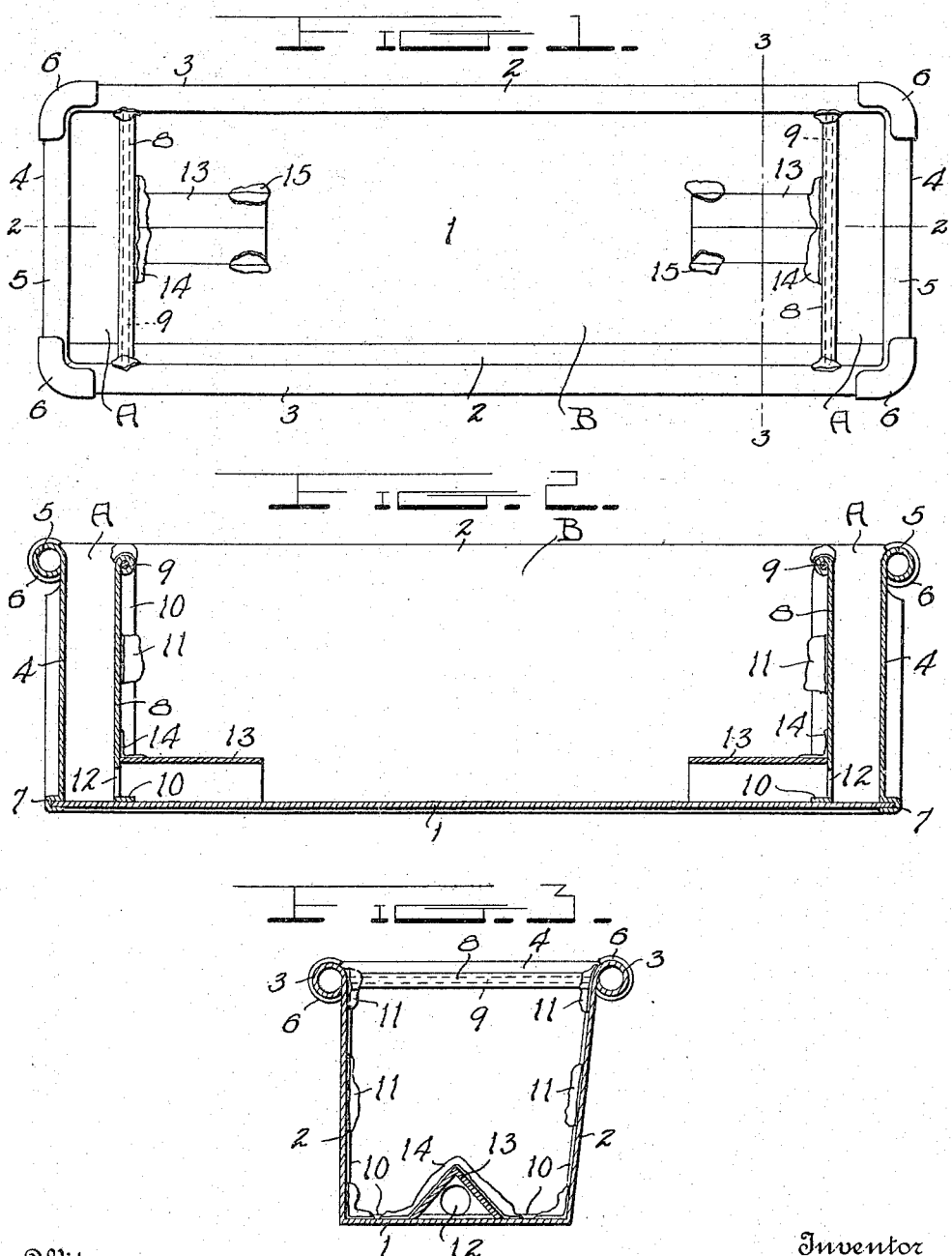

THOMAS P. BOLGER, OF GLOUCESTER, MASSACHUSETTS.

FLOWER-BOX.

1,229,022.  Specification of Letters Patent.  Patented June 5, 1917.

Application filed April 16, 1915. Serial No. 21,645.

*To all whom it may concern:*

Be it known that I, THOMAS P. BOLGER, a citizen of the United States, residing at Gloucester, in the county of Essex and State of Massachusetts, have invented certain new and useful Improvements in Flower-Boxes, of which the following is a specification.

The present invention relates to certain new and useful improvements in window boxes for flowers, and has for its object to provide a device of this character which embodies novel features of construction whereby a water-tight bottom is made possible without preventing proper drainage of the soil.

Further objects of the invention are to provide a window box which can be inexpensively constructed of sheet metal, which can be placed in a wicker basket or upon a stand without danger of the basket or stand being discolored and injured by drippings from the box, and which provides excellent drainage for the soil so that the soil will not become soggy and interfere with the growth of the plants.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a flower box constructed in accordance with the invention.

Fig. 2 is a vertical longitudinal sectional view through the same on the line 2—2 of Fig. 1.

Fig. 3 is a transverse sectional view through the box on the line 3—3 of Fig. 1.

Corresponding and like parts are referred to in the following description and indicated in all the views of the drawings by the same reference characters.

Specifically describing the present embodiment of the invention, the numeral 1 designates the bottom of the box, and the numerals 2 the opposed sides thereof, said sides being preferably formed integral with the bottom 1 and the upper edges thereof being rolled outwardly to provide hollow tubular ribs 3 which both reinforce the sides and provide handles adapted to be grasped when lifting or moving the box. The ends 4 have a water-tight connection with the bottom 1 and the sides 2 and have the upper edges thereof rolled outwardly to provide tubular reinforcing ribs 5 similar to the ribs 3 of the sides. The adjacent extremities of the end ribs 5 and side ribs 3 are connected by elbows 6 so that a substantially continuous tubular reinforcing rib extends continuously around the upper edge of the box. A rigid construction is thus provided which eliminates any possibility of the box being accidentally bent or distorted out of shape, and the tubular ribs are of a sufficient size to be readily grasped by the hands when lifting the flower box or moving it from place to place.

Any suitable means may be provided for attaching the end plates 4 to the bottom 1 and the sides 2, although in the present instance the edges of the end plates are shown as bent rearwardly and then returned so as to provide channels 7 to receive the edges of the bottom and sides. If desired, the joint thus provided may be soldered or otherwise treated to provide a water-proof connection.

Extending transversely across the interior of the box at a point adjacent each end thereof is an upright partition 8, said partitions providing drainage and watering chambers A at the opposite ends of the box. These chambers A open through the top of the box and extend entirely to the bottom thereof, being of the full width of the box throughout their entire depth. The upper edges of the upright partitions 8 are rolled around reinforcing wires 9, while the bottom and side edges thereof are extended laterally to provide the flanges 10 which serve both as a reinforcing means and also as a means for securing the partitions in place. These side flanges 10 fit against the corresponding walls of the box and may be secured thereto at intervals by any suitable means such as the solder 11. With this construction it is entirely possible for water within the main soil compartment B to seep around the edges of the partitions 8 between the points where the solder 11 is applied, thereby facilitating proper drainage of the flower box.

Each of the end partitions 8 is provided at a point toward the bottom thereof with a drain opening 12 which communicates with one end of a longitudinally extending drainage channel formed by an arched strip 13 which is applied to the bottom of the box. The inner ends of the arched strips 13 are soldered or otherwise secured to the corresponding partitions 8, as indicated at 14, while the edges of the arched strip 13 are connected at intervals to the bottom 1 by some suitable fastening means such as the solder 15. The outer ends of the arched strips 13 are open and face each other so that any surplus water accumulating at the bottom of the soil in the main compartment B will enter the arched drainage strips 13, either through the open ends thereof or under the edges thereof, and flow through the openings 12 into the drainage and watering chambers A. In a similar manner, the flower box can be watered by turning water into the end chambers A and letting it seep upwardly through the soil from the bottom of the box. The exterior of the box is watertight so that there will be no drippings or leakage from the box and it can be placed in a wicker basket or upon good furniture without danger of injury thereto. At the same time ample provision is made for draining the soil so that it will not become sour and soggy and interfere with the growth of the plants as well as becoming a menace to health.

Having thus described the invention, what I claim as new and desire to secure by Letters Patent, is:—

1. A substantially rectangular flower box formed with opposed ends and opposed sides and having a length considerably greater than its width, vertically disposed walls arranged within the ends of the box and associated with the ends thereof to provide vertical drainage and air chambers which open through the top of the box and extend entirely from the top to the bottom of the box, and longitudinally extending arched drainage strips applied to the bottom of the box and communicating with the before mentioned vertical drainage and air chambers at the bottom thereof.

2. A receptacle of the class described comprising side, end and bottom walls, the side and end walls being of uniform depth, a partition associated with the receptacle and arranged therein, the said partition being disposed parallel with respect to one of the end walls and being spaced therefrom to provide an open ended water chamber which extends the full width and depth of the receptacle and opens through the top thereof, and a conducting member arranged within and extending along the bottom of the receptacle, said conducting member communicating with the lower end of the before mentioned water chamber and serving to distribute water to the receptacle.

3. A receptacle of the class described comprising side, end and bottom walls, the side and end walls being of uniform depth, a partition associated with the receptacle and arranged therein, the said partition being disposed parallel with respect to one of the end walls and being spaced therefrom to provide an open ended water chamber which extends the full width and depth of the receptacle and opens through the top thereof, and a water conducting member arranged within and extending along the receptacle and communicating with the bottom of the before mentioned water chamber, said conducting member being constructed to discharge laterally at its sides so as to distribute water to different parts of the receptacle.

In testimony whereof I affix my signature in presence of two witnesses.

THOMAS P. BOLGER.

Witnesses:
 ARTHUR J. GRIMES,
 KATHERINE B. DIGGDON.

Copies of this patent may be obtained for five cents each, by addressing the "Commissioner of Patents, Washington, D. C."